(12) United States Patent
Röhner

(10) Patent No.: US 6,523,454 B2
(45) Date of Patent: Feb. 25, 2003

(54) DEVICE FOR MONITORING THE INTEGRITY OF A DIAPHRAGM

(75) Inventor: Gerhard Röhner, Hemsbach (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/859,824

(22) Filed: May 17, 2001

(65) Prior Publication Data

US 2002/0021970 A1 Feb. 21, 2002

(30) Foreign Application Priority Data

May 18, 2000 (DE) ........................ 100 24 118

(51) Int. Cl.[7] ................................. F16J 3/00
(52) U.S. Cl. ........................... 92/5 R; 92/103 F
(58) Field of Search ................... 92/5 R, 96, 98 R, 92/103 R, 103 F

(56) References Cited

U.S. PATENT DOCUMENTS

| | | | | |
|---|---|---|---|---|
| 2,693,827 A | * | 11/1954 | Bailey | 92/49 |
| 2,783,342 A | * | 2/1957 | Statham | 92/48 X |
| 2,811,984 A | * | 11/1957 | Chertock et al. | 92/102 |
| 3,336,555 A | * | 8/1967 | Pastan | 134/166 R |
| 4,852,581 A | * | 8/1989 | Frank | 338/4 |
| 4,934,902 A | * | 6/1990 | Mantell | 92/5 R X |
| 5,145,331 A | * | 9/1992 | Goes et al. | 95/5 R X |
| 5,560,279 A | * | 10/1996 | Connors et al. | 92/5 R X |

FOREIGN PATENT DOCUMENTS

| | | |
|---|---|---|
| DE | 37 29 726 | 3/1989 |
| DE | 40 27 027 | 3/1992 |
| WO | 95/06205 | 3/1995 |

* cited by examiner

Primary Examiner—Edward K. Look
Assistant Examiner—Michael Leslie
(74) Attorney, Agent, or Firm—Kenyon & Kenyon

(57) ABSTRACT

A device for monitoring the integrity of a diaphragm (1) of a diaphragm transport+ unit, made of one or a plurality of layers, having a resistance device (3) connected to one layer and having a measuring device interconnected to a current source (15) via a connecting arm (20), the measuring device being a Wheatstone bridge (2) in which the resistance device (3) forms a bridge resistance (S1, S2, S3, S4) in at least one bridge arm, and an incipient rupture of a layer of the diaphragm having the effect of altering the galvanometer arm voltage (B-D).

19 Claims, 12 Drawing Sheets

DEVICE FOR MONITORING THE INTEGRITY OF A DIAPHRAGM

BACKGROUND OF THE INVENTION

1. Technical Field

The present invention relates to a device for monitoring the integrity of a diaphragm in a diaphragm transport unit made of one or a plurality of layers, having a resistance device connected to one layer and having a measuring device interconnected to a current source via a link.

2. Background Information

In the chemical and pharmaceutical industries diaphragm pumps are in widespread use for delivering and metering liquids. The pump action is achieved by a periodic deflection of a diaphragm. In the following, by the word diaphragm is to be understood a flexible layer which, by itself or in connection with other layers, separates a transport chamber from a drive chamber in a diaphragm transport unit. The deflection of the diaphragm can be effected mechanically, e.g. by a moved metal flange, pneumatically or by hydraulic fluid. Thus one surface of the diaphragm is in direct contact with the transport medium. Depending on the area of application, the transport medium may be poisonous, toxic and also inflammable. For safety reasons and so as largely to rule out injury to people and damage to the environment and plant components, one endeavors to prevent the escape of transport medium by regular maintenance of the transport device and by monitoring the process. The diaphragm itself is subject to great alternating stress, and is mostly the component having the greatest rate of failure in these installations. The alternating stress is predefined by operating parameters such as pumping capacity, chemical composition and the temperature of the transport medium. In order to be sure to avoid the escape of critical liquids, the pump diaphragm is replaced after a certain operating time, within the scope of maintenance work. However, in doing so, one often replaces an intact diaphragm which still has a relatively high remaining service life. For reasons of safety, and so as to be able to conduct this maintenance work as efficiently as possible, an attempt is made to detect ahead of time impending damage by measurement technology, using suitable measuring devices. One should be able to ascertain a diaphragm rupture as far ahead of time as possible. The diaphragm should be changed safely before its failure, but with only a short service life remaining. In any case, an incipient rupture of the diaphragm, or a leak which has appeared, have to be detectable by the process control system.

Various devices are known for making damage in an agitated diaphragm technically measurable.

In German Laid-Open Document 37 29 726 a diaphragm having a plurality of layers is proposed, in which a membrane gap is furnished with a detector and monitors the gap. If one of the layers is destroyed, the fluid penetrates the gap and the leak detector recognizes what the trouble is. However, the detector records the leak only when enough liquid has leaked out. Only when the two layers of the diaphragm have been pushed sufficiently far apart, and liquid has reached the detector, is the damage recognized.

In German DE 40 27 027 C2, for the purpose of recognizing a location of rupture in a diaphragm made of a plurality of layers, monitoring the space between two layers is also proposed. The pump is driven hydraulically. The space between the two layers is set up in such a way that underpressure prevails compared to the atmosphere. The space is originally free of liquid. When one of the outer diaphragms is damaged, either hydraulic fluid or transport fluid penetrate into the space between the diaphragm layers. As a result, the pressure in this space changes. (It changes) either toward the discharge pressure or toward the working pressure. The pressure change is measured by a measuring transducer in a measuring chamber connected to this space. A pressure change always occurs when one of the two layers of the diaphragm pair ruptures. However, it can happen that the connecting duct to the measuring chamber does not open, and a status signal is released too late or not at all. Because of that, damage cannot be reliably prevented, because the remaining layer of the diaphragm pair, can, for a limited duration to be sure, still safeguard the pumping function, but it should not be excluded that it might come to a leak in the second diaphragm in rapd succession. In a hydraulically driven pump hydraulic fluid can get into the transport chamber. This is always a disadvantage if high purity of the delivered fluid is important.

In WO 95/06205, for predicting a fault of a pump diaphragm, using an electrically conductive fiber made of polytetrafluoroethylene is proposed. This conductive fiber is embedded in a diaphragm layer of the same material. The fiber is dimensioned in such a way that it essentially covers the entire area of the diaphragm in the form of a spiral or double spiral, or in zigzag shape. The ends of the fiber are brought out at the edge, and can be connected to an electrical measuring device. The resistance of the fiber in ohms is measured. As soon as the diaphragm layer shows signs of fatigue or rupture, these are transferred to the fiber. Since the fiber is made of the same or very similar material as the diaphragm itself, the sagging life of the diaphragm is just about the same as that of the fiber. As a result of the signs of fatigue or the fissures of the diaphragm, the conductivity of the fiber changes, and thereby a fissure or beginning rupture can be detected with measuring technology and can be signaled. A disadvantage is the very expensive production of the conductive plastic fiber and its embedding into the diaphragm. A further disadvantage is the dependence of the quantity to be measured on the temperature of the transport medium. The post-connected electronic signal enhancer has to distinguish between a change of resistance, caused by a sign of fatigue, an extension on account of pump lift and a temperature-dependent change of resistance.

SUMMARY OF THE INVENTION

The object of the present invention is based on creating a device with the aid of which the integrity of a diaphragm in a diaphragm transport unit can reliably be monitored in a simple manner. The device should be refined in such a way that the monitoring is as independent as possible of the temperature and flow of the transport fluid in the transport chamber, and independent of a long-term deviation of the measuring device itself.

The object is attained by a device in which at least one layer of a multi-layer diaphragm is interconnected to a resistance device and to a measuring device having a current source, according to the present invention, by the measuring device's working in the manner of a Wheatstone bridge in which the resistance device forms a bridge resistance in at least one bridge arm and an incipient rupture of a layer of the diaphragm effects a change in the galvanometer arm voltage.

On account of the change in the electrical resistance of a resistive sensor, connected to a diaphragm layer, which is positioned in at least one bridge arm of a resistance measuring bridge, the integrity of a diaphragm in a transport unit can be monitored in a technically simple manner. The sensitivity of the measuring bridge makes it possible reliably to detect an incipient rupture, spreading in one of the layers of the diaphragm, already in the preliminary stages. Wheatstone bridges are precision measuring devices for measuring resistances by comparison with built-in resistances of known values. In the present case, the bridge resistances of the measuring device can be advantageously integrated in a technically simple way with the diaphragm transport unit. This circuit arrangement of the kind of the Wheatstone bridge leads to a simple and space saving construction of the monitoring unit. In an advantageous further refinement, the bridge circuit makes possible the positioning of the bridge resistances in such a way that the disturbing influence of the temperature of the transport fluid and also the long-term drift of the resistive sensor can be eliminated.

The resistance device can be formed from various suitable electrically conductive structures, such as a metal structure, a conductive nonwoven fabric structure, a conductive adhesive structure or a structure made of conductive plastic. Production of these conductive structures can take place, for example, by etching, cutting, stamping or printing. The conducting structure can be fixed adjacently to one surface of a layer diaphragm, and it can also be embedded in the layer.

Advantageously, the resistance device is a surface conductor loop whose material is made of a conductive plastic. Such materials can be easily printed flat on a diaphragm layer using silk-screening. Commercial silver conductive adhesive on a polyester substrate is suitable, for example. Especially preferred is a surface conductor loop made of an electrically conductive elastomer. This can also be fastened to the diaphragm layer in a technically simple manner, for instance, by silk-screening or prevulcanizing. By electrically conductive elastomer is meant an elastomer formed by cross-linkage of a plastically deformable rubber with the addition of conductive fillers. The specific resistance of this elastomer conductor loop can be set by the concentration of the conductive filler. For the resistance device, an elastomer conductor loop has proved effect, which is formed from a material having a specific electrical resistance of less than 300 ohm-cm.

It is of advantage if the resistance device is formed from two electrical resistances of a surface conductor loop, and these are adjacently connected to one layer of the diaphragm. The Wheatstone bridge is then formed from these and two electrical reference resistances not connected to the diaphragm. In this arrangement, the influence of the temperature of the transport medium has an effect in both bridge arms on both resistances S1 and S2 at the same time. On the assumption that S1 and S2 demonstrate the same temperature properties, the galvanometer arm voltage between points B and D of the Wheatstone bridge is independent of the temperature of the transport medium. The long-term properties of electrical resistances S1 and S2 also act symmetrically. This is meaningful since the electrical resistance of an elastomer conductor loop decreases when a mechanical stress is put on the elastomer conductor loop. The electrical resistance of these materials is also timewise unstable and changes with aging. On account of the preferred symmetrical positioning in two bridge arms, this long-term deviation, also denoted as drift, is eliminated. On the other hand, an incipient rupture of the diaphragm, which changes the value of resistances S1 or S2, is reliably recognized. The advantage of the Wheatstone bridge is that even a very small amount of damage of the printed conductor cross-section of the surface conductor brings about a significant change in the galvanometer arm voltage. Thus, an incipient rupture can be detected very early.

It is also of advantage if the resistance device is formed from four electrical resistances of a surface conductor loop, which is adjacently connected to one layer of the diaphragm, and the Wheatstone bridge is formed from these resistances. In this way, the resistance device is distributed symmetrically to four sectors of the diaphragm. In addition to the above-named advantages, asymmetrical flow conditions in the transport chamber, and a disturbing influence of the measuring signal that goes along with it on account of the temperature of the transport medium, can now also be offset.

It is of particular advantage if a layer of the diaphragm is formed as a protective layer lying toward a transport chamber, and the surface conductor loop is prevulcanized or bonded to an inner surface of the protective layer averted from this transport chamber. The development of the conductor loop as a surface conductor and the positioning of this surface conductor at the protective layer has the effect that, during the operation of the pump, the diaphragm and the sensor are submitted to approximately the same bending alternating stress. Since the failure of a diaphragm is almost always preceded by a rupture spreading from the transport chamber in the direction of the diaphragm, damage can be recognized early. A rupture in the protective layer changes the conductivity of the surface conductor and is detected with measuring technology. Leakage of transport liquid from the pump is prevented.

It is quite especially advantageous if the protective layer of the diaphragm is made of polytetrafluoroethylene and is connected to the rubber-elastic diaphragm disc. This construction of the diaphragm makes possible, on the one hand, very good protection from aggressive chemical media, and on the other hand it makes possible the elasticity of the elastomer for a long operating time. Almost always the protective layer of the diaphragm fails before the rubber-elastic diaphragm disc breaks. The monitoring conductor positioned at the inner surface of the protective layer thus detects an incipient rupture before the entire diaphragm fails.

In an especially preferred way, the surface conductor loop is made of a material composition which has the same elastomer as the diaphragm disc and contains an electrically conductive filler. Thus the connection of the layers to the sensors is produced very well. Production of the diaphragm is thereby made simpler. The preformed sensor element is simply placed between the layers of the diaphragm during molding as a non-vulcanized or fully cured part. By adhesion or vulcanization a firm adjacent connection is created between sensor and diaphragm layer.

Here, electrically conductive fillers such as graphite particles or metal particles are used, and, especially preferred, conductive carbon black.

It can be of especially great advantage if the material of the surface conductor loop has a flexural strength which is less than the flexural strength of the material of one of the layers of the diaphragm. Whilst the material properties of the surface conductor are chosen in that way, a rupture occurs in the sensor before a fissure in the diaphragm layer begins to develop. In other words, the monitoring device signals an expected material fatigue of the diaphragm before an aspect of the damage (becomes apparent). In particular, in application areas having critical safety considerations, the diaphragm can in this way be changed with great safety before its failure, yet without an excessively high remaining service life.

In another advantageous development the surface conductor loop is placed, in a meandering shape, into a ring-shaped deformation area of the diaphragm. By doing this, it is possible that an incipient fissure of the diaphragm is recognized very early. As seen in the cross-section of the diaphragm, a fissure most often begins on the surface of the protective layer facing the transport fluid. From there, it broadens out into deeper lying areas of the layer. From an upper view of the diaphragm the longitudinal growth of the fissure takes place mostly in the circumferential direction. Depending on the distance between the meanders of the surface conductor loop, a still very small damage to the diaphragm can be reliably recognized. The shape of the meander, however, also makes it possible that the radial spreading of a fissure is reliably detected.

The measuring device can advantageously be integrated into the diaphragm transport unit, that is, the circuitry of the measuring device is accommodated directly in a subsection of the housing of the diaphragm transport unit. In case of damage, only the diaphragm together with the resistance device are changed. The measuring device may contain signal preprocessing and may have available a standardized electrical interface. In this manner, a plurality of transport units can be connected to one electronic bus system. A process control system can therefore monitor a plurality of diaphragm pumps simultaneously. For monitoring the diaphragm, the measuring electronics can contain a microcomputer or microcontroller. This digital signal processing is of advantage, for example at start-up of the device. The bridge balance of the measuring device can simply take place in situ by starting an initialization program which sets the diagonal voltage of the measuring bridge to zero. The same applies to changing the diaphragm in connection with maintenance work.

It is also preferred that a current monitoring device monitor the time average of the current in the link. This makes possible monitoring the performance reliability of the monitoring device itself. For example, a conductor break in the measuring unit leads to a change in the mean current in the link between the measuring device and the current source. In connection with a process control system, this makes remote monitoring of the monitoring unit possible. Even in the rare case when both surface conductor loops are damaged simultaneously and in equal measure during a fissure, this current monitoring device makes it possible that diaphragm damage is reliably recognized in this case too.

One can obtain a very sensitive monitoring device by positioning the resistance device in the form of a half-bridge. In this case it is favorable if the resistance value of the reference resistances (R1, R2) is at least ten times as great as the resistance value of the surface conductor loop (S1, S2).

It is advantageous if the surface conductor loop is laid out in such a way that the ends of the loop are brought to the outer edge and are provided with electrical connectors, e.g. a plug connector. Thereby the sensor diaphragm can be simply connected to a measuring device, for instance a resistance measuring bridge. Naturally, it is also possible to design the connector as a contacting element, so that the electrical connection of the resistance device can take place directly by contacts at the housing halves in the clamping area of the diaphragm.

Quite especially preferred is an elastomeric conductor loop having similar mechanical properties to the rubber-elastic diaphragm itself. This is obtained by adding conductive carbon black to the elastomer as electrically conductive filler. That permits the production of an elastomeric conductor loop in which the tensile strength lies between 8–25 N/mm$^2$, the elongation at break lies between 50 and 400% and the specific resistance is actually lower than 300 ohm-cm. Compared to other conductive plastics, as used, for instance, for electrically conducting floors, the electrical resistance of the elastomeric conductor loop is low. With regard to the measured value processing, the electrical resistance of the conductor loop lies in a favorable range.

BRIEF DESCRIPTION OF THE DRAWINGS

The present invention is explained in detail below, using exemplary embodiments represented in the drawings.

The figures show:

DETAILED DESCRIPTION

Figure 1:
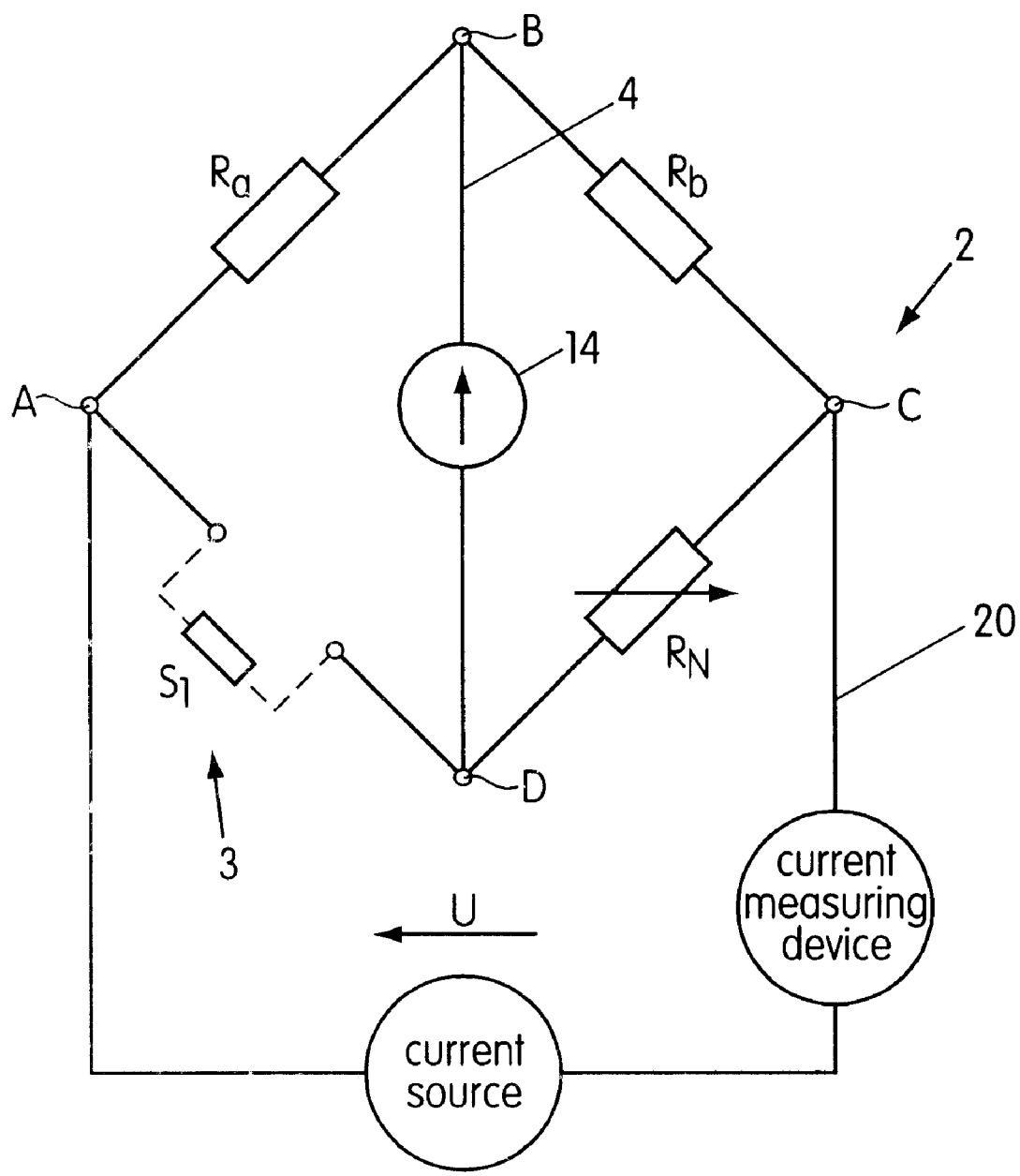
Figure 2:
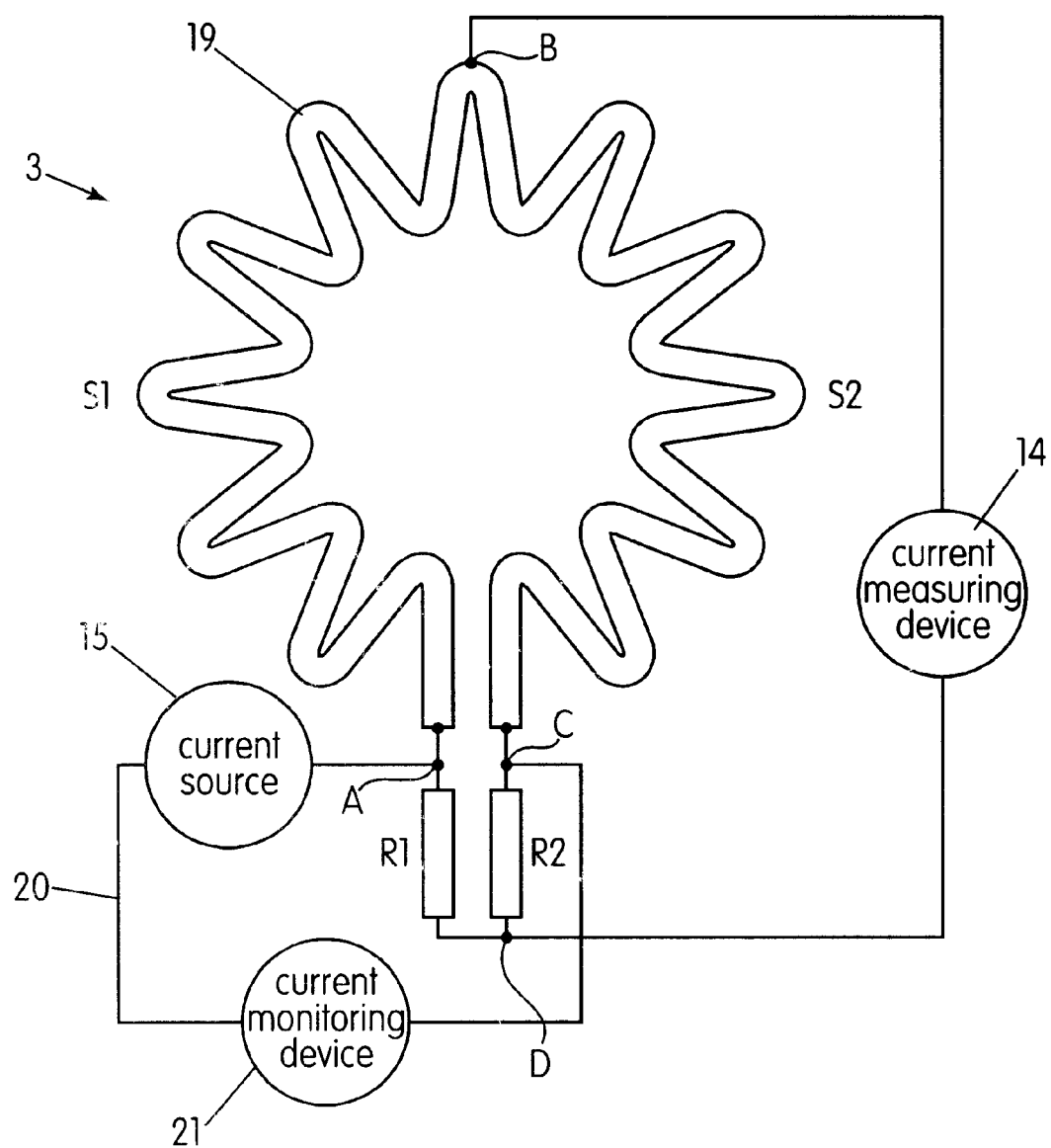
Figure 3:
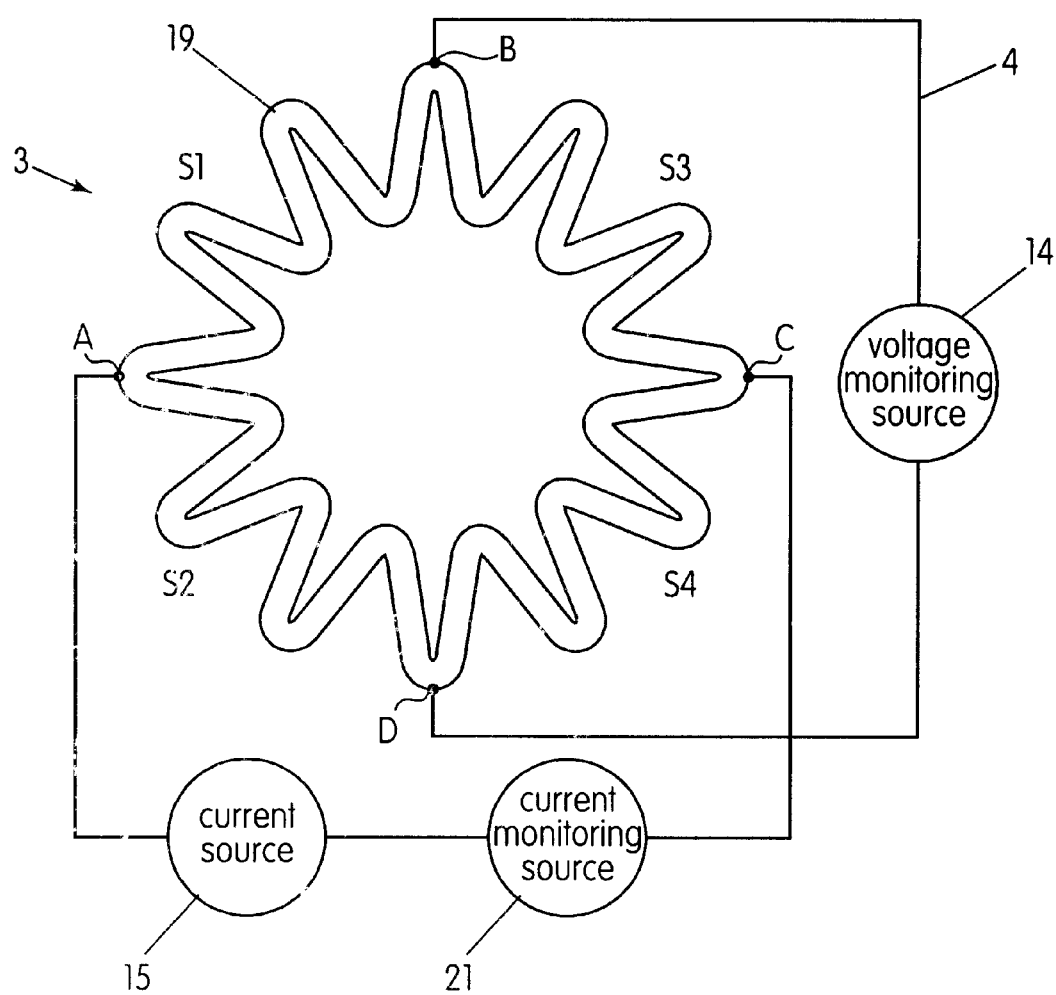
Figure 4:
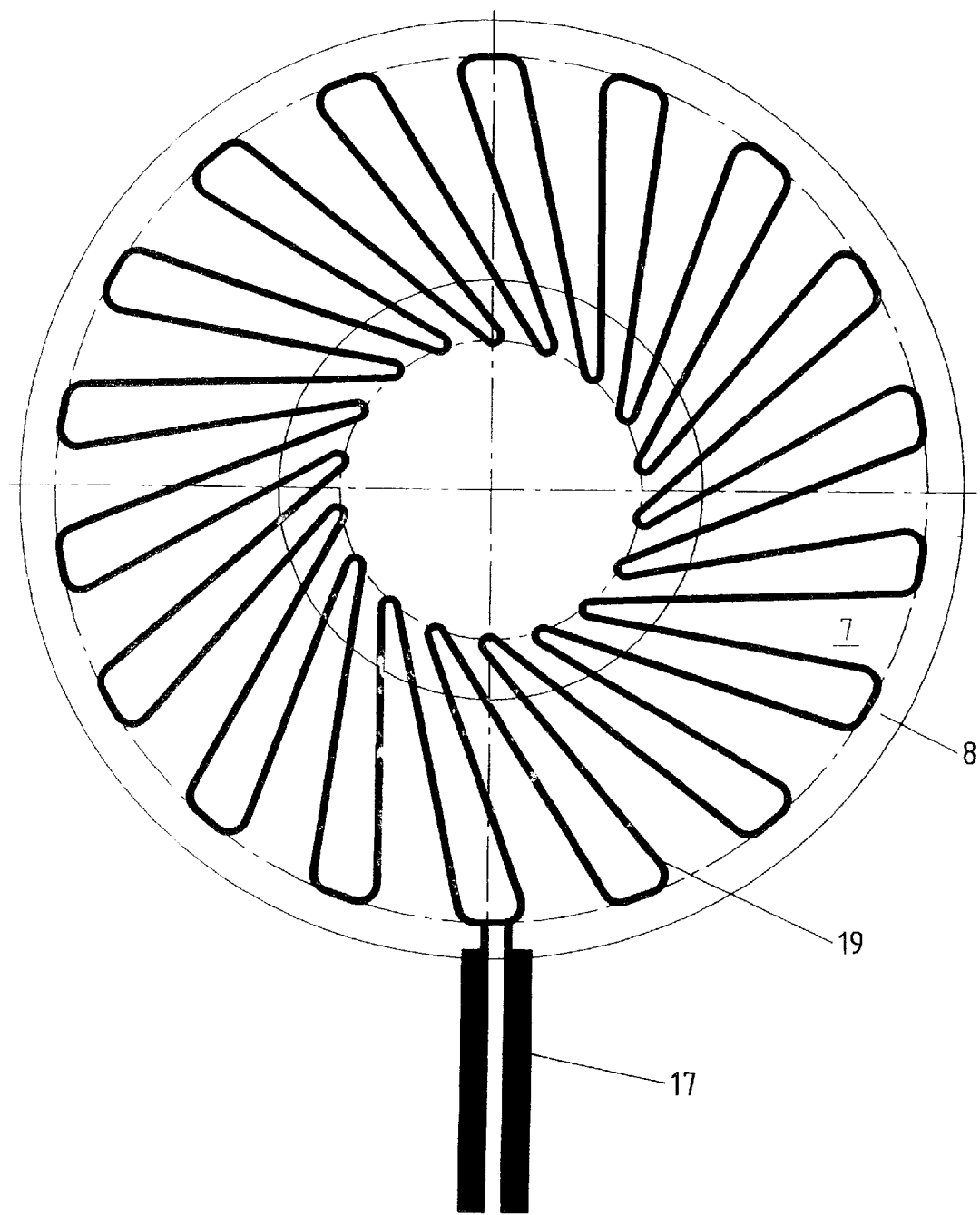
Figure 5:
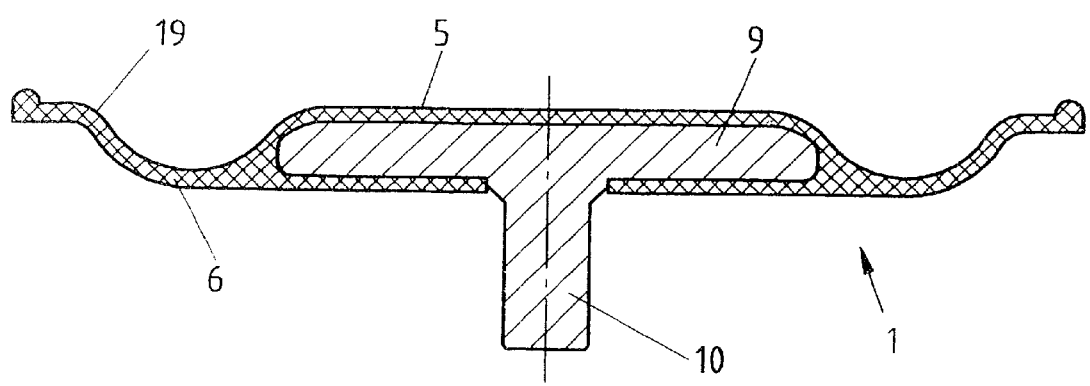
Figure 6:
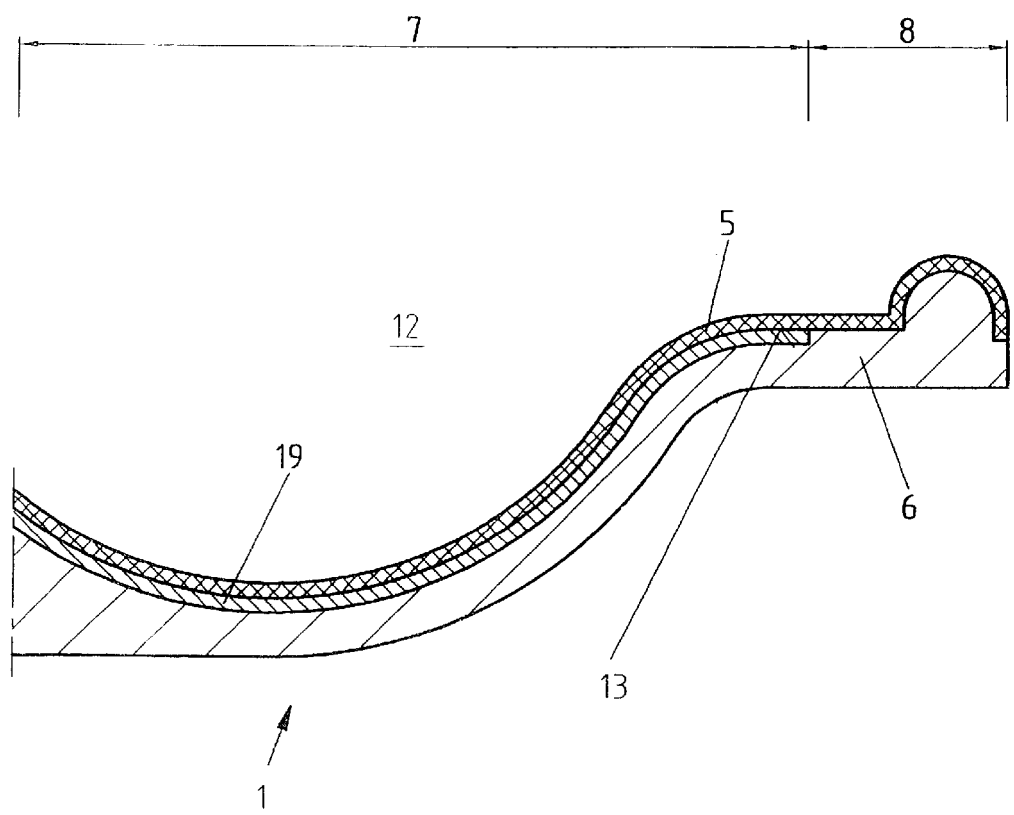

FIG. 1 a device for monitoring the integrity of a diaphragm having a measuring device along the lines of a Wheatstone bridge, FIG. 2 a device for monitoring the integrity of a diaphragm having a measuring device along the lines of a Wheatstone bridge having two electrical resistances of an electrical surface conductor loop in two bridge arms, FIG. 3 a device for monitoring the integrity of a diaphragm having a measuring device along the lines of a Wheatstone bridge having four electrical resistances of a surface conductor loop in four bridge arms, FIG. 4 a top view of a pump diaphragm, FIG. 5 a cross-section illustration through a mechanically activated diaphragm, FIG. 6 a partial depiction of a section through a pump diaphragm and FIGS. 7 to 12 each a top view of a pump diaphragm having a surface conductor loop in schematic representation.

FIG. 1 shows a set-up in the form of a Wheatstone bridge in which the resistances Ra, Rb, S1, Rn are connected in a square. The diagonally opposite points A and C are connected to a current source 15 and a current monitoring device 21 by a connecting lead 20. The opposite points B and D of the square are connected to a detector 14 by a diagonal branch 4. Detector 14 can detect a difference or diagonal voltage between points B and D using the zero or deflection method. In the adjusted condition of the measuring bridge, the galvanometer arm voltage between points B and D of the square is zero.

FIG. 2 shows a Wheatstone bridge in which the resistance element 3 is formed by a surface conductor loop 19. Surface conductor loop 19 is connected between points B, A and B, C of the bridge. The external bridge resistances are marked R1 and R2, and the ohmic resistances of the surface conductor loop are marked S1 and S2. In FIG. 2 the surface conductor loop is shown in a meander pattern. They are in direct contact with a layer of the diaphragm not shown in FIG. 2. As soon as a rupture begins to spread in diaphragm 1 it has an effect on the adjacent surface conductor loop 19 and causes a reduction in the conductor surface of surface conductor loop 19. As a result, the electrical resistance S1 or S2 of surface conductor loop 19 changes. The change in electrical resistance S1 or S2 has the consequence in the bridge circuit that a potential difference sets in between the points B and D of the square of the Wheatstone bridge which corresponds to the damage of the conductive track cross-section of resistance device 3. Because of the set-up in the form of a Wheatstone bridge, it is possible to detect even very small damage to the surface conductor loop. Using exemplary embodiments, it could be shown that the set-up according to the present invention can even sense an approximately 22% damage to the conductive track cross-section. Compared to simple measurement of resistance, the bridge circuit is twice as sensitive. The arrangement of the electrical resistances S1 and S2 in the form of a half bridge circuit, as in FIG. 2, has the advantage that the temperature of the transport medium does not have a disturbing effect on the quantity to be measured. A change in resistance conditional upon stress on, or aging of the material of surface conductor loop 19 also does not lead to a change in the galvanometer arm voltage between points B and D. Thus, on account of the further refinement shown in FIG. 2 of the present invention, the device becomes independent of disturbing influences of the transport medium and of long-term drift. The reference resistances R1 and R2 can be accommodated directly in the housing of the diaphragm transport unit together with evaluation electronics, which makes a simple and compact construction of the monitoring device possible in situ. In view of the measuring technology sensitivity of the monitoring device, it is advantageous if the resistance value of reference resistances R1 and R2 are each respectively greater than resistances S1 and S2 of the surface conductor loop. In the practical production of the half bridge as in FIG. 2 it has proven effective for the resistance value of the reference resistances to be picked to be about ten times-as great as the resistance value of the surface conductor resistances.

FIG. 3 illustrates a further advantageous embodiment of the present invention. The resistance square is here formed by resistances S1, S2, S3, S4 of surface conductor loop 19. That means that the individual bridge resistances cover sectors of the diaphragm. Thus, the individual resistances are geometrically arranged symmetrically in the deformation area of the diaphragm. Thereby disturbances caused by movement and temperature of the transport medium can be smoothed out better. Asymmetrical flow conditions in the diaphragm act in each case in two bridge arms, so that it does not come to an unwanted change in the galvanometer arm voltage on account of the flow conditions of the transport chamber. Here too, the diagonal points A, B, C, and D of the square are interconnected to energy supply 15, to a current monitoring device 21 and to a measuring device 14.

FIG. 4 illustrates a top view of a pump diaphragm having a surface conductor loop 19, whose ends are brought into a mounting region 8 of diaphragm 1 and are there provided with a connector 17 for connecting to a measuring device that is not shown.

FIG. 5 shows a section through a mechanically activated diaphragm. The section drawing shows a metallic flange 9 embedded in a rubber-elastic layer 6 of the diaphragm. On the side facing the transport chamber, elastomer layer 6 is covered with a protective layer 5, and surface conductor loop 19 is located between protective layer 5 and rubber-elastic layer 6 of the diaphragm. The deflection of the diaphragm takes place via a drive acting on plug 10.

A partial section of a multi-layer pump diaphragm is shown in FIG. 6. In this case, surface conductor loop 19 is adjacently fixed to an inner surface 13 of protective layer 5 facing away from transport chamber 12 and is embedded in rubber-elastic material of diaphragm layer 6. The surface conductor loop here covers a dynamic region 7 of diaphragm 1, which adjoins a mounting region 8.

Various possibilities of contacting a surface conductor loop are illustrated in top view in FIGS. 7 through 12. It is advantageous if the contacting of the surface conductor loop takes place outside the dynamically stressed diaphragm region, as, for instance, in mounting region 8.

Figure 7:
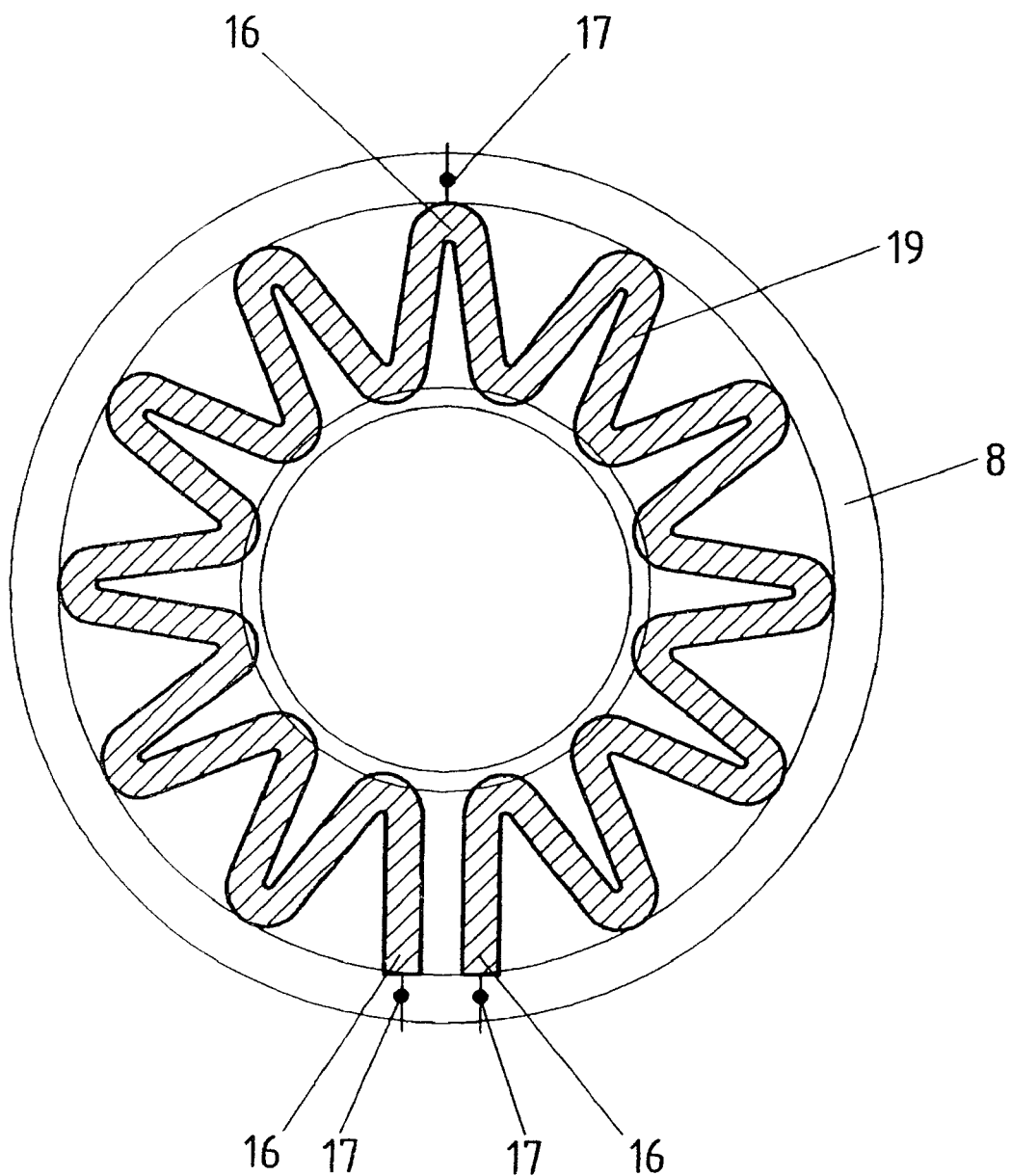

In FIG. 7 ends 16 of surface conductor loop. 19 are provided with an electrical connector 17 in mounting region 8. In case of damage, the pump diaphragm according to the present invention is changed together with connector 17.

Figure 8:
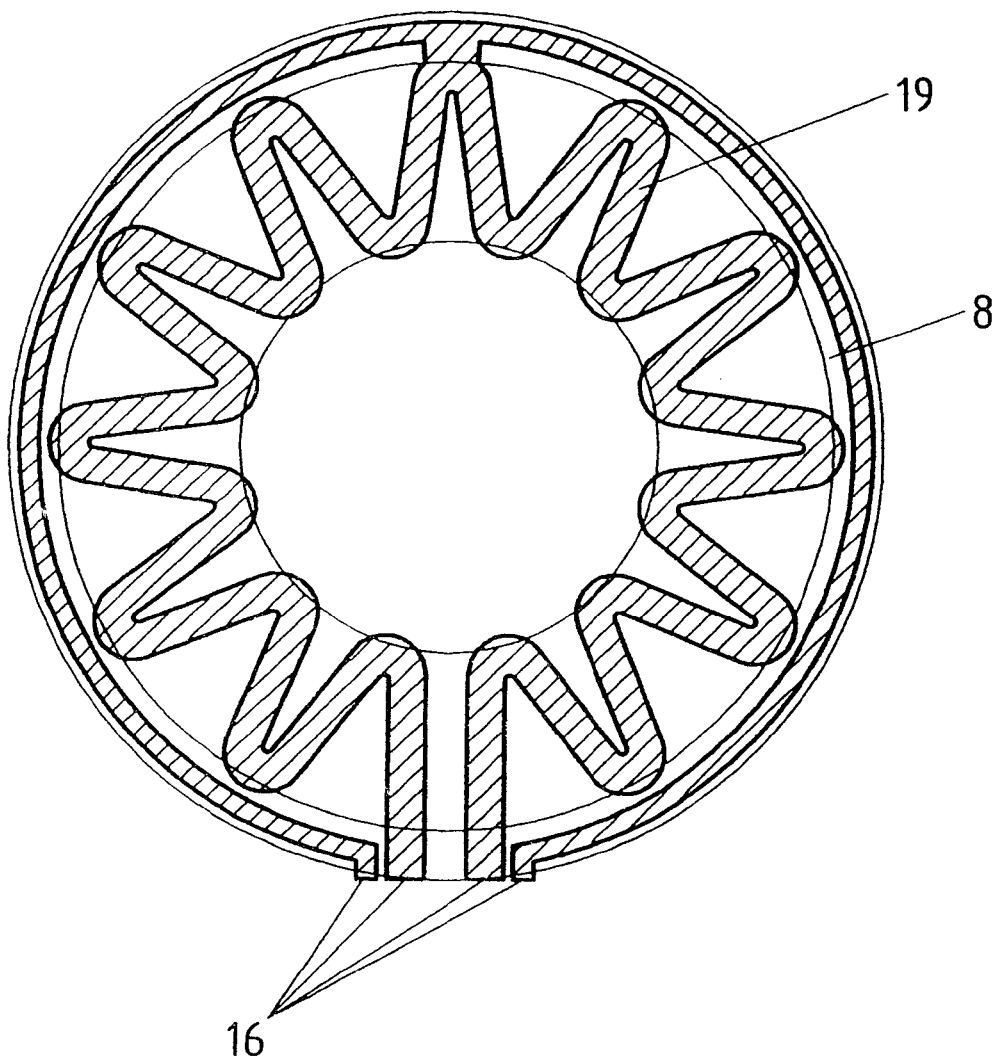
Figure 9:
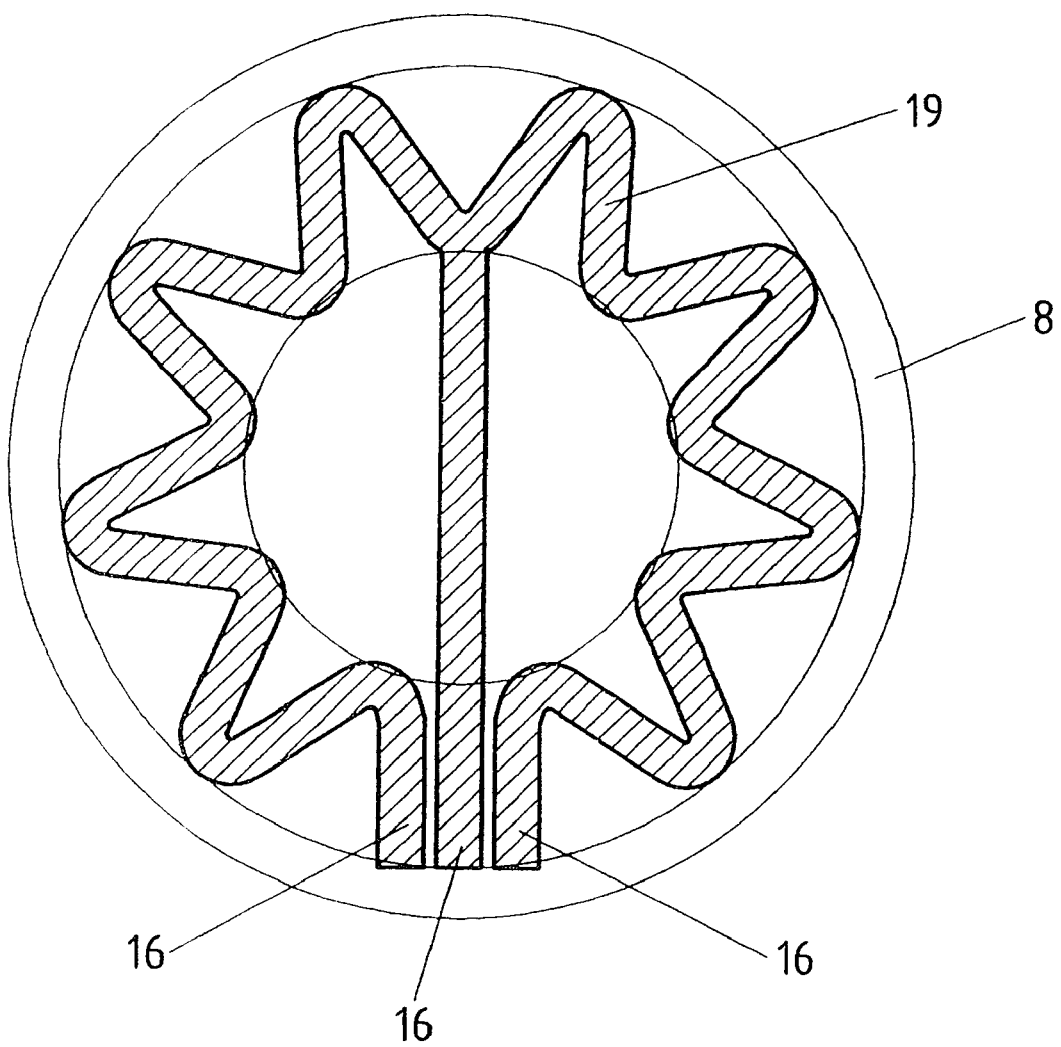

FIGS. 8 and 9 show different possibilities as to how ends 16 of surface conductor loop 19 can be brought together centrally in mounting region 8.

Figure 10:
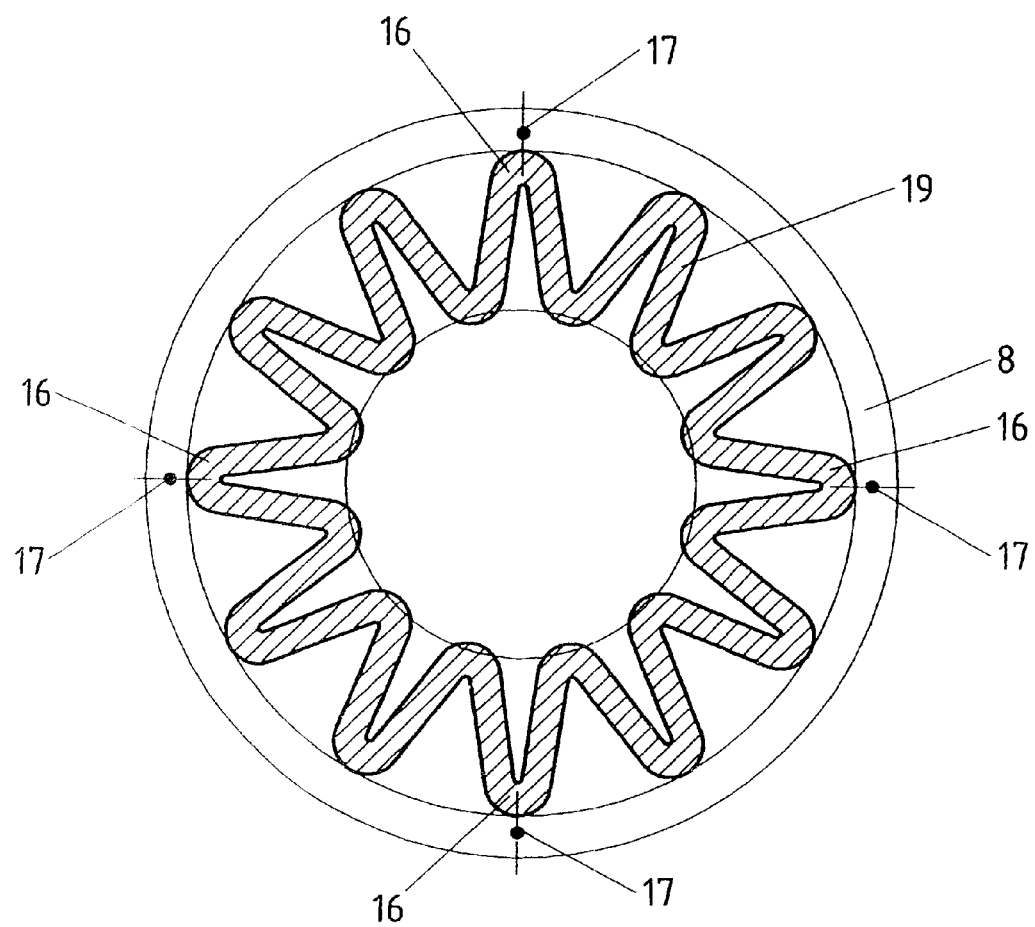
Figure 11:
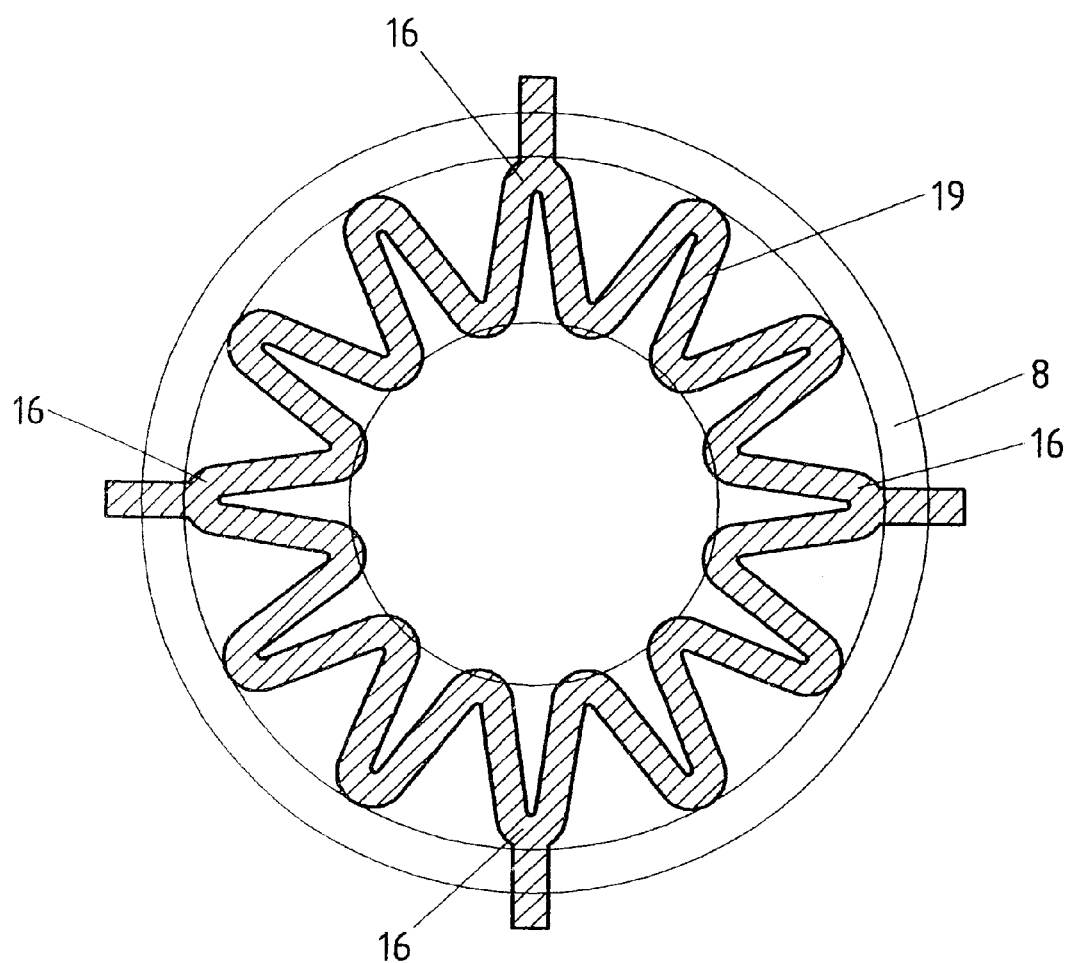

In FIG. 10 ends 16 of surface conductor loop 19 are each provided with an electrical connector 17. The illustrated set-up on the diaphragm corresponds to the whole bridge circuit as in FIG. 3. The electrical connection of loop 19 is advantageously made by electrical connectors in mounting region 8.

FIG. 1 shows a surface conductor loop 19 having ends 16 which are brought out beyond outer mounting region 8. In this exemplary embodiment of the diaphragm, contacting takes place outside mounting region 8.

Figure 12:
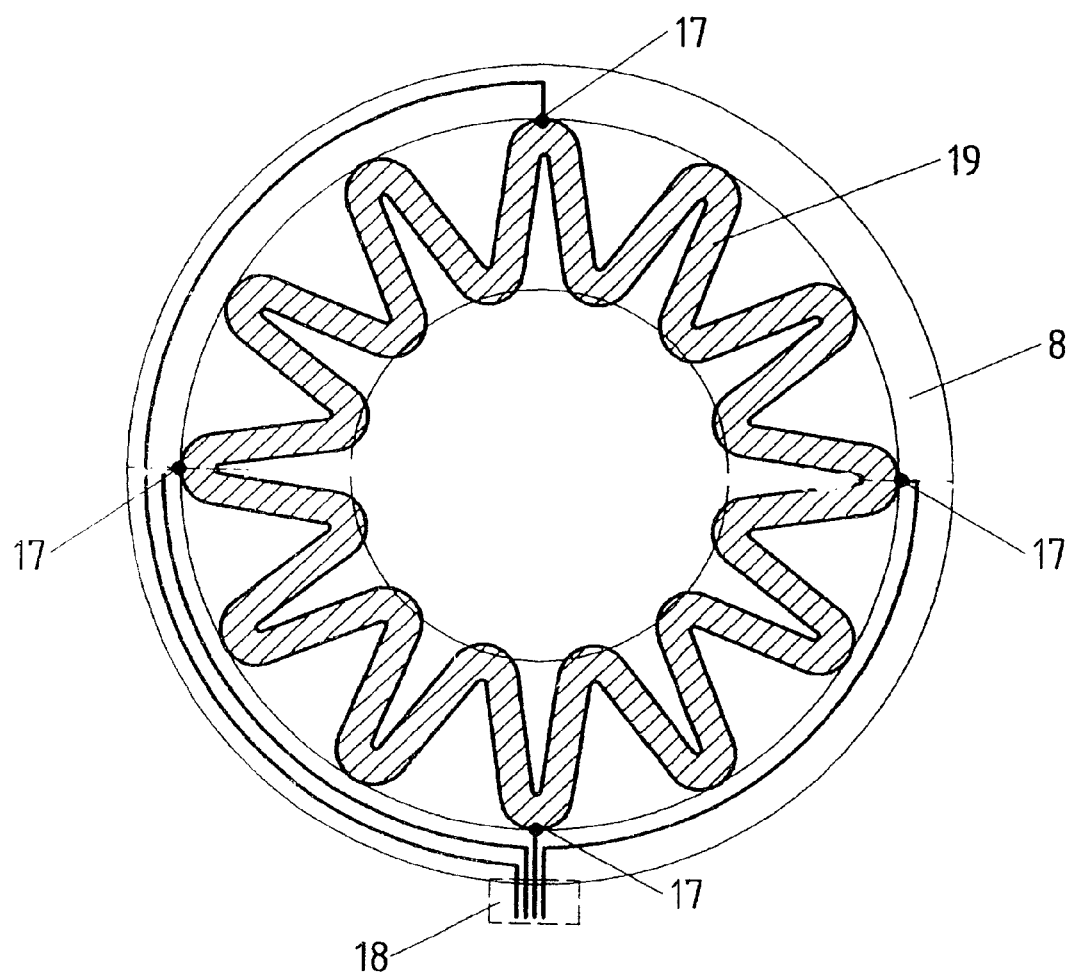

A preferred connecting technique is shown in FIG. 12. Connectors 17 are here connected to electrical terminals which are brought together in mounting region 8 and end in a plug connector 18.

What is claimed is:

1. A device for monitoring the integrity of a diaphragm (1) of a diaphragmed transport unit, having at least one layer, the device comprising: a resistance device (3) connected to one layer and having a measuring device interconnected to a current source (15) via a connecting arm (20), wherein the measuring device is a Wheatstone bridge (2) in which the resistance device (3) forms a bridge resistance (S1, S2, S3, S4) in at least one bridge arm, and an incipient rupture of a layer of the diaphragm has the effect of altering the galvanometer arm voltage (B-D), wherein the resistance device (3) includes four electrical resistances (S1, S2, S3, S4) of a surface conductor loop (19), the electrical resistances interconnect with each other and adjacently connected to one layer of the diaphragm (1) forming the Wheatstone bridge on the diaphragm.

2. The device according to claim 1, wherein the resistance device (3) is a surface conductor loop (19) made of electrically conductive plastic.

3. The device according to claim 2, wherein the resistance device (3) is a surface conductor loop (19) made of electrically conducting elastomer.

4. The device according to claim 2, wherein a current monitoring device (21) monitors the average value over time of the current in the connecting arm (20).

5. The device according to claim 1, wherein the measuring device is integrated in the diaphragm transport unit.

6. The device according to claim 1, wherein a current monitoring device (21) monitors the average value over time of the current in the connecting arm (20).

7. A device for monitoring the integrity of a diaphragm (1) of a diaphragmed transport unit, having at least one layer, the device comprising: a resistance device (3) connected to one layer and having a measuring device interconnected to a current source (15) via a connecting arm (20), wherein the measuring device is a Wheatstone bridge (2) in which the resistance device (3) forms a bridge resistance (S1, S2, S3, S4) in at least one bridge arm, and an incipient rupture of a layer of the diaphragm has the effect of altering the galvanometer arm voltage (B-D), and the resistance device (3) includes two electrical resistances (S1, S2) of a surface conductor loop (19), which is adjacently connected to one layer of the diaphragm (1); and the Wheatstone bridge is formed by this and by two electrical, reference resistances (R1, R2) not connected to the diaphragm.

8. The device according to claim 7, wherein one layer of the diaphragm (1) is formed as a protective layer (5) facing a transport chamber (12) and the surface conductor loop (19) is prevulcanized to or bonded to an inner surface (13) of the protective layer (5) facing away from this transport chamber.

9. The device according to claim 8, wherein the protective layer (5) is made of polytetrafluoroethylene and wherein the diaphragm (1) has at least one further layer (6) which is made of an elastomer.

10. The device according to claim 9, wherein the material of the surface conductor loop (19) is formed by a combination of the at least one further layer (6) of the diaphragm (1) made of the same elastomer and an electrically conductive filler.

11. The device according to claim 10, wherein the electrically conductive filler contains graphite particles or metal particles or conductive carbon black.

12. The device according to claim 10, wherein the material of the surface conductor loop (19) has a flexural strength which is approximately equal to or less than the flexural strength of the material of one of the layers (5, 6) of the diaphragm (1).

13. The device according to claim 8, wherein the surface conductor loop (19) is positioned in meander form in a ring-shaped deformation region (7) of the diaphragm (1).

14. The device according to claim 7, wherein one layer of the diaphragm (1) is formed as a protective layer (5) facing a transport chamber (12) and the surface conductor loop (19) is prevulcanized to or bonded to an inner surface (13) of the protective layer (5) facing away from this transport chamber.

15. The device according to claim 7, wherein a current monitoring device (21) monitors the average value over time of the current in the connecting arm (20).

16. The device according to claim 7, wherein the resistance value R1, R2 is at least ten times as great as the resistance value S1, S2.

17. A pump diaphragm comprising at least one layer of a flexible material, wherein:

a) at least one layer of the diaphragm is connected to a surface conductor (19) loop of a flexible surface conductor in such a way that an incipient rupture of this layer brings about a change in the electrical resistance of the surface conductor, wherein four electrical resistances (S1, S2, S3, S4) are interconnected with each other to define the surface conductor loop (19), and b) a surface conductor loop has ends (16) having electrical connectors (17) which are exposed at the outer edge of the pump diaphragm for being connected to a resistance measuring device.

18. The pump diaphragm according to claim 17, wherein the surface conductor loop is formed from an electrically conducting elastomer and has ends (16) which are brought together and end in a plug connector (18).

19. The pump diaphragm according to claim 17, wherein the surface conductor loop has a specific resistance of less than 300 ohm-cm, a tensile strength between 8 and 25 N/mm$^2$, an elongation at break between 50 and 400%.

* * * * *